US010037719B2

(12) United States Patent
Zhang

(10) Patent No.: US 10,037,719 B2
(45) Date of Patent: Jul. 31, 2018

(54) FORGERY-PROOF LABEL AND FABRICATION METHOD THEREOF

(71) Applicant: BOE TECHNOLOGY GROUP CO., LTD., Beijing (CN)

(72) Inventor: Song Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/511,203

(22) PCT Filed: Mar. 21, 2016

(86) PCT No.: PCT/CN2016/076835
§ 371 (c)(1),
(2) Date: Mar. 14, 2017

(87) PCT Pub. No.: WO2016/165527
PCT Pub. Date: Oct. 20, 2016

(65) Prior Publication Data
US 2017/0278437 A1 Sep. 28, 2017

(30) Foreign Application Priority Data
Apr. 14, 2015 (CN) .......................... 2015 1 0175981

(51) Int. Cl.
*G06K 19/00* (2006.01)
*G09F 9/33* (2006.01)
*G09F 3/20* (2006.01)
*G09F 13/22* (2006.01)
*G09F 9/30* (2006.01)

(52) U.S. Cl.
CPC ................ *G09F 9/33* (2013.01); *G09F 3/208* (2013.01); *G09F 13/22* (2013.01); *G09F 9/30* (2013.01); *G09F 2013/222* (2013.01)

(58) Field of Classification Search
CPC ...................................................... G06K 19/00
USPC .................................. 235/487, 492; 345/107
See application file for complete search history.

(56) References Cited

U.S. PATENT DOCUMENTS

2008/0262932 A1* 10/2008 Wareham ............... G06Q 30/02 705/14.4
2009/0267891 A1* 10/2009 Ali ........................ G06F 1/1626 345/107
2013/0008967 A1 1/2013 Chen

FOREIGN PATENT DOCUMENTS

CN 2833728 Y 11/2006
CN 102314813 A 1/2012
CN 202196435 U 4/2012
CN 202422588 U 9/2012
CN 203217884 U 9/2013
(Continued)

OTHER PUBLICATIONS

Office Action in Chinese Application No. 201510175981.8 dated Nov. 27, 2015, with English translation. 7 pages.
(Continued)

*Primary Examiner* — Daniel Hess
(74) *Attorney, Agent, or Firm* — Womble Bond Dickinson (US) LLP

(57) ABSTRACT

The present disclosure discloses a forgery-proof label and a fabrication method thereof. The forgery-proof label includes a thin film battery and an OLED display unit operable to display a first preset pattern when being powered by the thin film battery. The forgery-proof label is easy to recognize and difficult to reuse.

17 Claims, 6 Drawing Sheets

(56) References Cited

FOREIGN PATENT DOCUMENTS

| | | | |
|---|---|---|---|
| CN | 104809959 | A | 7/2015 |
| EP | 2270768 | A1 | 1/2011 |
| TW | M259279 | U | 3/2005 |

OTHER PUBLICATIONS

International Search Report and Written Opinion in PCT/CN2016/076835 dated Jun. 1, 2016, with English translation. 14 pages.

Search Report in Chinese Application No. 201510175981.8 dated Sep. 25, 2015, with English translation.

Office Action in Chinese Application No. 201510175981.8 dated Sep. 25, 2015, with English translation.

* cited by examiner

FORGERY-PROOF LABEL AND FABRICATION METHOD THEREOF

CROSS-REFERENCE TO RELATED APPLICATIONS

The present application is the U.S. national phase entry of PCT/CN2016/076835, with an international filing date of Mar. 21, 2016, which claims the benefit of Chinese Patent Application No. 201510175981.8, filed on Apr. 14, 2015, the entire disclosures of which are incorporated herein by reference.

TECHNICAL FIELD

The present disclosure relates to the field of forgery-proof label technology, and particularly to a forgery-proof label and a fabrication method thereof.

BACKGROUND

A forgery-proof label is an identifier for purposes of anti-forgery that is adhered to, printed on, or transferred to a surface of a subject matter or a package thereof. The forgery-proof label may alternatively take a form of a separate accessory (e.g., a tag) from the subject matter. The forgery-proof label is presently applied in a range of industries.

An identifying characteristic and an ability to prevent reusage are two aspects of the forgery-proof label. The existing forgery-proof label is often difficult to recognize by consumers and is easy to reuse or forge, resulting in frequent occurrence of counterfeit products. This causes loss of the consumers and legitimate manufactures. Therefore, there is a need for an improved forgery-proof label.

SUMMARY

Embodiments of the present disclosure provide a forgery-proof label and a method of fabricating such a forgery-proof label.

According to an aspect of the present disclosure, a forgery-proof label is provided comprising a thin film battery and an OLED display unit operable to display a first preset pattern when being powered by the thin film battery.

In an embodiment, the OLED display unit comprises a substrate, an OLED element arranged on the substrate and having a light-emitting region of the first preset pattern, an encapsulation layer arranged on the OLED element and extending along an outline of at least part of the light-emitting region for defining a path along which water and oxygen corrode the OLED element, and an encapsulation thin film arranged on the OLED element and the encapsulation layer for protecting the OLED element from corrosion by the water and oxygen.

In an embodiment, the encapsulation layer is arranged to incompletely encompass the light-emitting region when viewed from above such that the path has an entrance. The encapsulation thin film is arranged to have a removable portion corresponding to the entrance.

In an embodiment, the OLED element comprises an anode layer, a pattern demarcation layer arranged on the anode layer for defining the light-emitting region of the first preset pattern, an organic functional layer arranged in the light-emitting region, and a cathode layer arranged on the organic functional layer and in the light-emitting region. The organic functional layer is operable to provide light emission upon application of power supplied by the thin film battery to the anode layer and the cathode layer.

In an embodiment, the substrate is made of glass, metal, quartz or organic material.

In an embodiment, the encapsulation layer is made of inorganic material or a combination of inorganic material and organic material.

In an embodiment, the inorganic material comprises at least one of SiNx, SiOx or SiCN.

In an embodiment, the forgery-proof label further comprises a thin film insulation sheet arranged between the OLED display unit and the thin film battery for providing electrical insulation therebetween. The thin film insulation sheet is removable such that when it is removed the OLED display unit has access to power supplied by the thin film battery.

In an embodiment, part of the thin film insulation sheet is exposed outside the OLED display unit.

In an embodiment, the first preset pattern comprises a character or a figure.

In an embodiment, the OLED display unit is a flexible display unit.

According to another aspect of the present disclosure, a method of fabricating a forgery-proof label is provided. The method comprises steps of: fabricating an OLED display unit; providing a thin film battery; and assembling the OLED display unit with the thin film battery to form the forgery-proof label. The OLED display unit is operable to display a first preset pattern when being powered by the thin film battery.

In an embodiment, the step of fabricating the OLED display unit comprises: providing a substrate; forming an OLED element on the substrate, the OLED element having a light-emitting region of the first preset pattern; forming an encapsulation layer on the OLED element, the encapsulation layer extending along an outline of at least part of the light-emitting region for defining a path along which water and oxygen corrode the OLED element; and forming an encapsulation thin film on the OLED element and the encapsulation layer for protecting the OLED element from corrosion by the water and oxygen.

In an embodiment, forming the OLED element on the substrate comprises: forming an anode layer on the substrate; forming an pattern demarcation layer on the anode layer for defining the light-emitting region of the first preset pattern; forming an organic functional layer in the light-emitting region; and forming a cathode layer on the organic functional layer and in the light-emitting region.

In an embodiment, the step of assembling the OLED display unit with the thin film battery further comprises: providing a thin film insulation sheet between the OLED display unit and the thin film battery. The thin film insulation sheet is removable such that when it is removed the OLED display unit has access to power supplied by the thin film battery.

These and other aspects of the present disclosure will be apparent from and elucidated with reference to the embodiment(s) described hereinafter.

DETAILED DESCRIPTION

Embodiments of the present disclosure are described below in detail in connection with the accompanying drawings.

Figure 1:
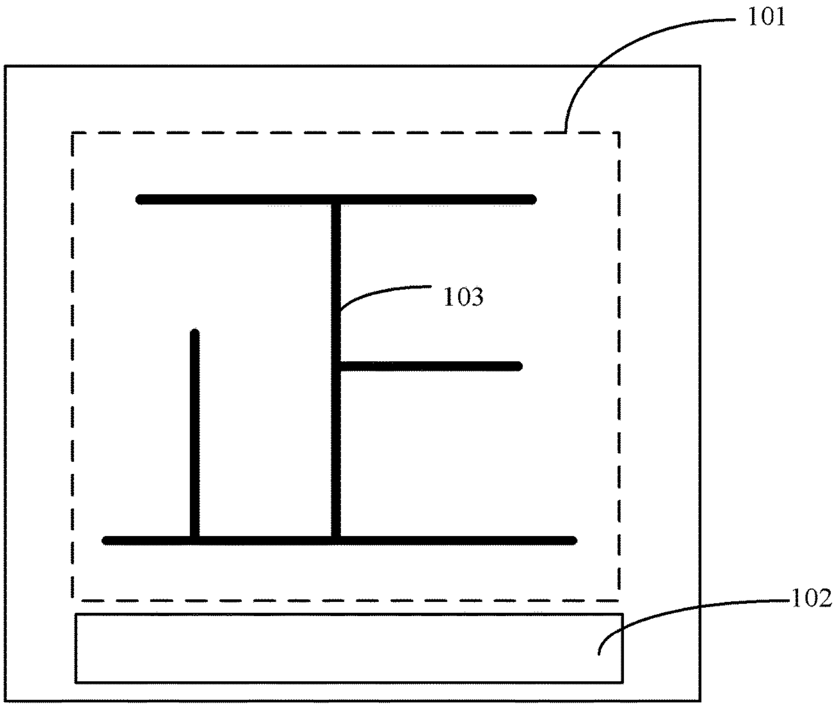
FIG. 1 is a schematic diagram of a forgery-proof label according to an embodiment of the present disclosure.

FIG. 1 is a schematic diagram of a forgery-proof label according to an embodiment of the present disclosure. As shown in FIG. 1, the forgery-proof label includes an OLED display unit 101 and a thin film battery 102. The OLED display unit 101 displays a first preset pattern 103 when being powered by the thin film battery 102.

The thin film battery 102 may be, for example, a thin film solar cell. The OLED display unit may be, for example, a flexible display unit. The OLED display unit 101 is operably connected to the thin film battery 102 (e.g., via electrical contacts). In the example shown in FIG. 1, the OLED display unit 101 and the thin film battery 102 are arranged side by side. In other embodiments, the OLED display unit 101 and the thin film battery 102 may be arranged in other manners. For example, the OLED display unit 101 and the thin film battery 102 are stacked on top of each other. In either case, the OLED display unit 101 can be powered by the thin film battery 102 (e.g., via electrical contacts).

The OLED display unit 101 displays the first preset pattern when being powered by the thin film battery 102 such that this forgery-proof label may be easily recognized by a consumer. The preset pattern may also distinguish this forgery-proof label from the labels of other counterfeit products.

Figure 2:
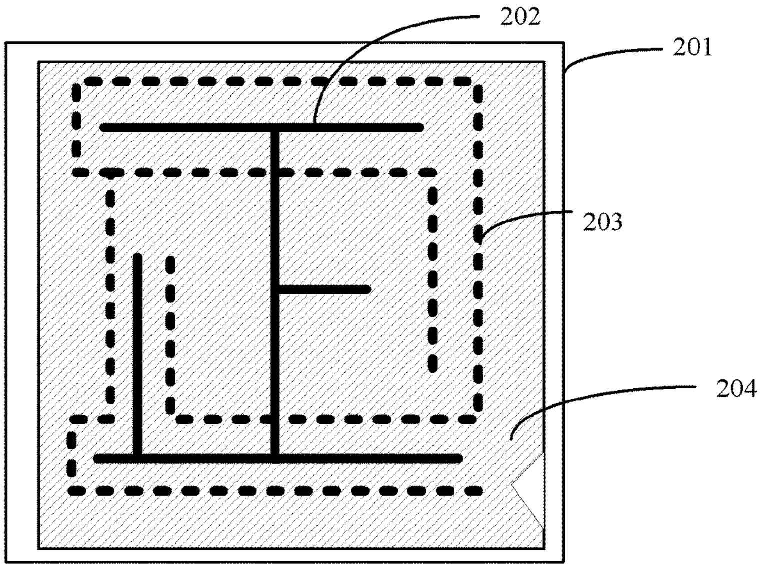
FIG. 2 is a plan view schematically showing a structure of an OLED display unit in a forgery-proof label according to an embodiment of the present disclosure.

FIG. 2 is a plan view schematically showing a structure of an OLED display unit in a forgery-proof label according to an embodiment of the present disclosure. As shown in FIG. 2, the OLED display unit includes a substrate 201 and an OLED element 202. The OLED element 202 is arranged on the substrate 201 and has a light-emitting region of the first preset pattern. When the OLED display unit is powered up, the OLED element 202 provides light emission in the light-emitting region so as to display the first preset pattern. It should be understood that the view as shown in FIG. 2 is taken from a rear side of the OLED display unit, because the substrate usually serves as a light emergent surface of the OLED display unit.

As is known, the OLED device is prone to corrosion by water and oxygen in the air and thus fails. The inventors recognize that this can be used to provide the forgery-proof label with an ability to prevent reusage. To this end, the OLED display unit further includes an encapsulation layer 203. The encapsulation layer 203 is arranged on the OLED element 202 and extends along an outline of at least part of the light-emitting region (as indicated by the dashed lines) to define a path along which the water and oxygen corrode the OLED element 202. The OLED display unit further includes an encapsulation thin film 204. The encapsulation thin film 204 is arranged on the OLED element and the encapsulation layer to protect the OLED element from being corroded by the water and oxygen.

In an embodiment, the encapsulation layer 203 is arranged to incompletely encompass the light-emitting region when viewed from above such that the path has an entrance. In some embodiments, the portion of the encapsulation thin film that corresponds to the entrance may be destructed to allow the water and oxygen in the air to enter the inside of the OLED display unit from this entrance. Alternatively or additionally, the encapsulation thin film 204 may be arranged to have a removable portion corresponding to the entrance. FIG. 2 shows an example where the (triangular) removable portion of the encapsulation thin film 204 that is located at the lower right corner has been removed. In this case, the water and oxygen in the air will enter the inside of the OLED display unit from the entrance. Due to the existence of the encapsulation layer 203, the water and oxygen entering the inside of the OLED display unit cannot spread in arbitrary directions on the surface of the OLED element 202. Instead, they will progressively corrode the OLED element 202 along the path defined by the encapsulation layer 203.

Figure 3:
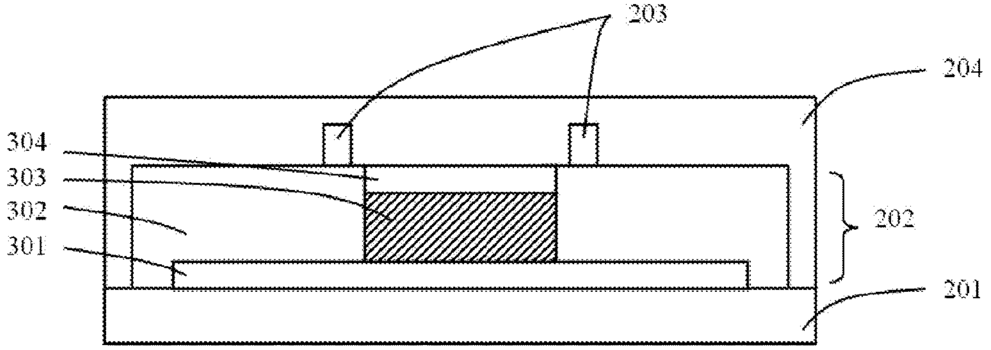
FIG. 3 is a cross-sectional view schematically showing a structure of an OLED display unit in a forgery-proof label according to an embodiment of the present disclosure.

Referring to FIG. 3, it shows more clearly the structure of the OLED display unit in the forgery-proof label according to an embodiment of the present disclosure. In an embodiment, the OLED display unit includes a substrate 201, the OLED element 202, the encapsulation layer 203 and the encapsulation thin film 204. Specifically, the OLED element 202 includes an anode layer 301, a pattern demarcation layer 302, an organic functional layer 303 and a cathode layer 304. More specifically, the pattern demarcation layer 302 is arranged on the anode layer 301 to define the light-emitting region of the first preset pattern, the organic functional layer 302 is arranged in the light-emitting region, and the cathode layer 304 is arranged on the organic functional layer 303 and in the light-emitting region. The organic functional layer 303 is operable to provide light emission upon application of power supplied by the thin film battery to the anode layer 301 and the cathode layer 304. As is known, the organic functional layer 303 may include an electron injection layer, an electron transmission layer, an organic light-emitting layer, a hole transmission layer and a hole injection layer.

In an embodiment, the encapsulation layer 203 has a certain height and extends along an outline of at least part of the light-emitting region. The encapsulation layer 203 acts as a "wall" to define the path along which the water and oxygen corrode the OLED element 202. In this way, the progress of the corrosion can be controlled to achieve a regular (segment-by-segment) failure of the OLED element 202. Thus, such a forgery-proof label cannot be reused. Moreover, the segment-by-segment failure can be regarded as a distinct property that enhances the identifying characteristic of the forgery-proof label. Additionally, arrangement of the encapsulation layer 203 and fabrication of the OLED display unit require some technology conditions such that the resultant forgery-proof label can be difficult to forge.

In some embodiments, the substrate 201 is made of glass, metal, quartz or organic material. However, embodiments are possible where the substrate is made of other materials. In some embodiments, the encapsulation layer 203 is made of inorganic material or a combination of inorganic material and organic material. The inorganic material may include at least one of SiNx, SiOx or SiCN.

Figure 4:
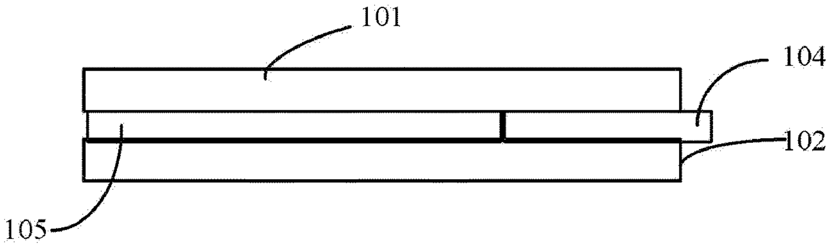
FIG. 4 is a cross-sectional view schematically showing a structure of a forgery-proof label according to an embodiment of the present disclosure.

FIG. 4 is a cross-sectional view schematically showing a structure of a forgery-proof label according to an embodiment of the present disclosure. As shown in FIG. 4, the forgery-proof label further includes a thin film insulation sheet 104 arranged between the OLED display unit 101 and the thin film battery 102, and adhesive 105 (e.g., a double-sided adhesive tape) for adhering the OLED display unit 101 to the thin film battery 102. The thin film insulation sheet 104 is removable such that when it is removed the OLED display unit 101 has access to the power supplied by the thin film battery 102. In the example shown in FIG. 4, the OLED display unit 101 may have electronical contacts (not shown) arranged on the bottom surface. When the thin film insulation sheet 104 is removed, the electrical contacts are exposed to the thin film battery 102 to receive power from the thin film battery 102. In this example, part of the thin film insulation sheet 104 is exposed outside the OLED display unit 101 to facilitate the performance of the removal.

Due to the existence of the thin film insulation sheet 104, the OLED display unit 101 will not always be in operation. When the forgery-proof label is used to verify authenticity of a subject matter, the thin film insulation sheet 104 is removed to allow the OLED display unit 101 to receive the power from the thin film battery 102 (via the electrical contacts), and thus displays the first preset pattern. This design enables employment of a thin film battery of a small capacity, thus saving the cost of the forgery-proof label.

Figure 5A:
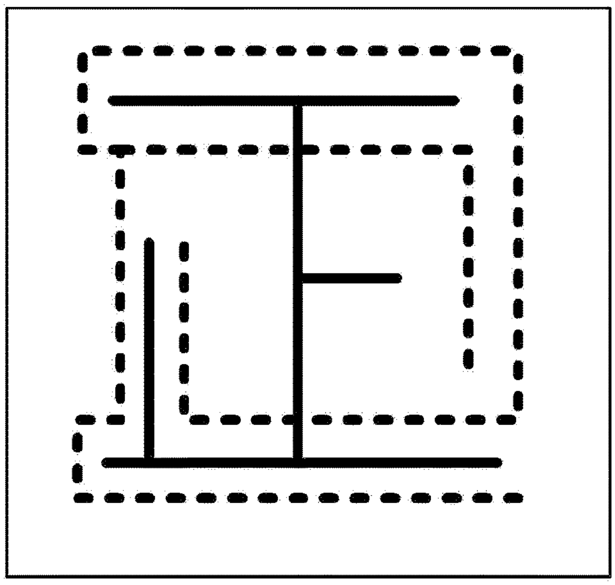
FIG. 5A is a schematic diagram of an OLED display unit having a light-emitting region of a specific character pattern and a corresponding encapsulation layer, according to an embodiment of the present disclosure.
Figure 5B:
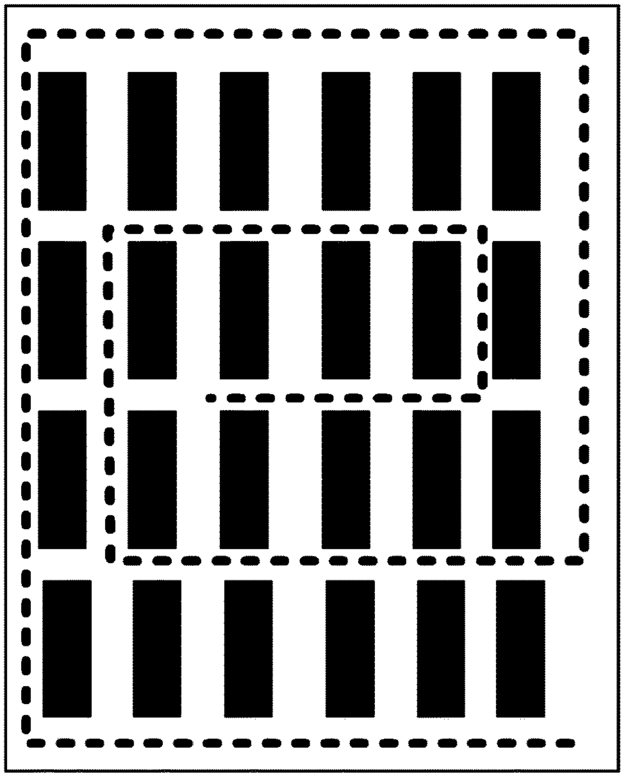
FIG. 5B is a schematic diagram of an OLED display unit having a light-emitting region of a specific figure pattern and a corresponding encapsulation layer, according to an embodiment of the present disclosure.

In some embodiments, the first preset pattern includes a character or a figure. FIGS. 5A and 5B show an OLED display unit having a light-emitting region of a specific character pattern and an OLED display unit having a light-emitting region of a specific figure pattern, respectively. In an embodiment, the specific figure pattern includes multiple blocks arranged in a matrix. In particular, the dashed lines are used in FIGS. 5A and 5B to indicate the encapsulation layers that extend along the outline of at least part of respective light-emitting regions. The well-designed path of the encapsulation layer further enhances the ability of the forgery-proof label to prevent counterfeit.

Figure 6A:
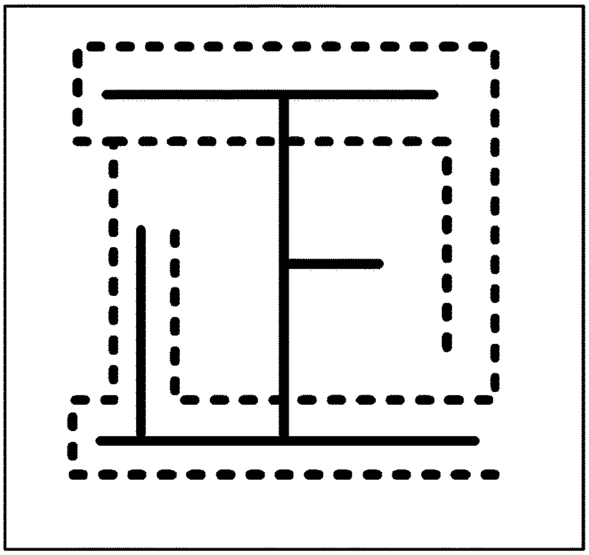
FIGS. 6A to 6E are schematic diagrams showing a process in which a light-emitting region of a specific character pattern in an OLED display unit according to an embodiment of the present disclosure is corroded segment by segment.
Figure 6B:
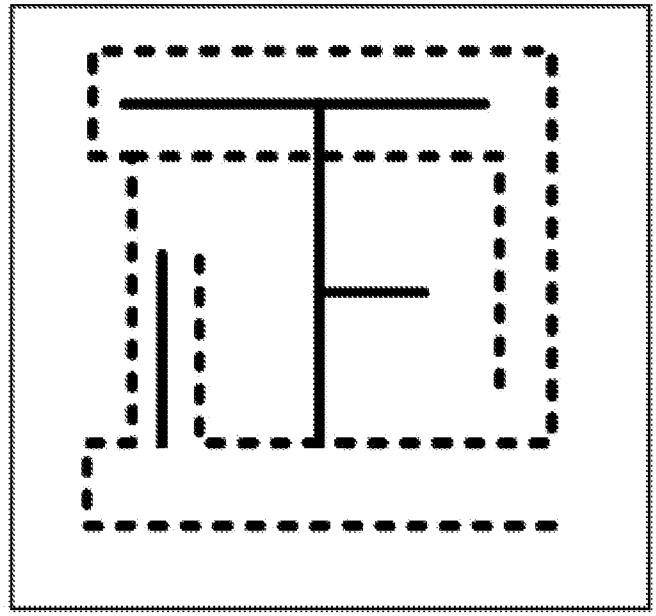
Figure 6C:
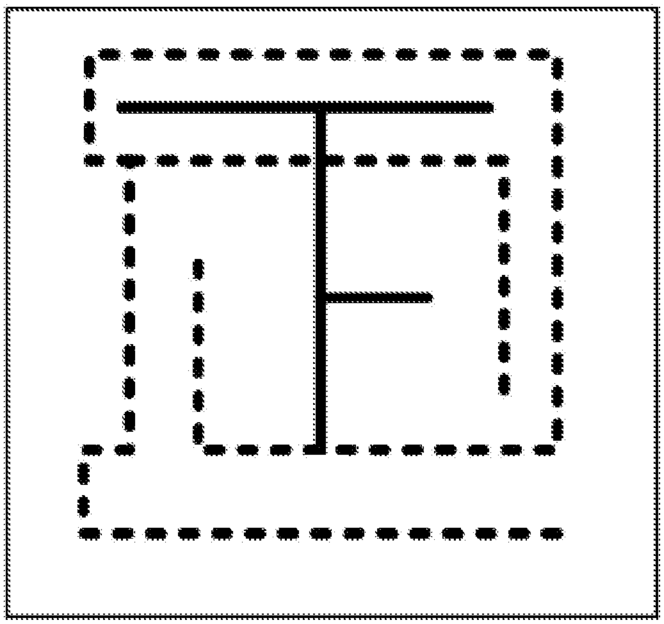
Figure 6D:
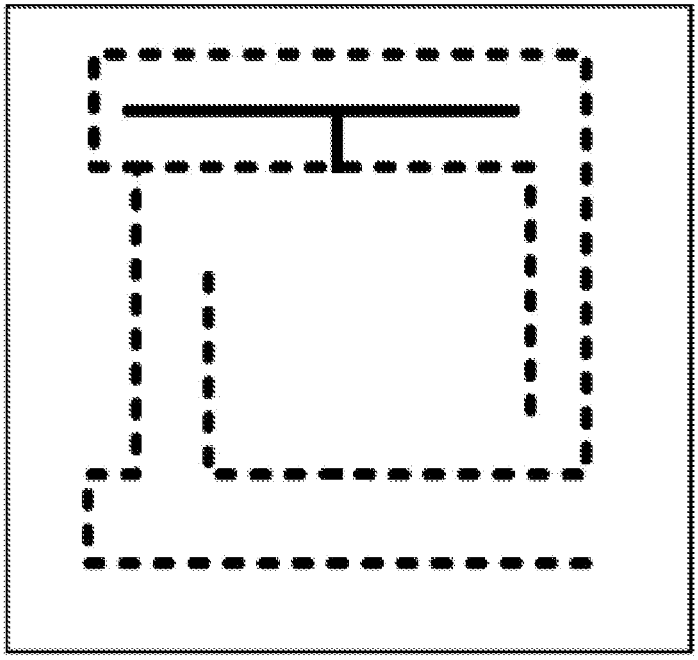
Figure 6E:
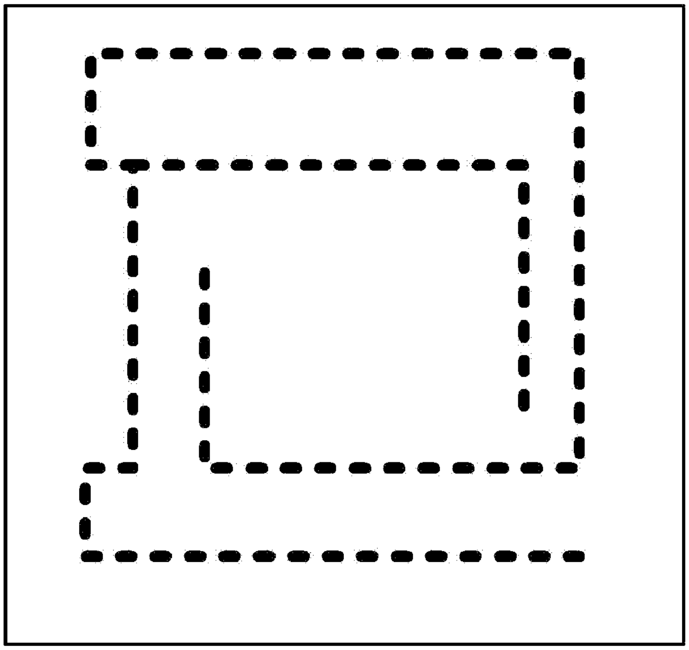

FIGS. 6A to 6E show a process in which a light-emitting region of a specific character pattern in an OLED display unit according to an embodiment of the present disclosure is corroded segment by segment. FIG. 6A shows a start state where the light-emitting region of the specific character pattern of the OLED display unit is lighted. As the removable portion of the encapsulation thin film is removed, the air enters the inside of the OLED display unit through the entrance of the path defined by the encapsulation layer (indicated by the dashed lines), and then corrodes the OLED element along this path. As shown in FIG. 6B, the lower portion of the specific character pattern is corroded first such that a corresponding portion of the light-emitting region is extinguished. Next, the left portion of the specific character pattern is corroded such that a corresponding portion of the light-emitting region is extinguished, as shown in FIG. 6C. Then, the middle portion of the specific character pattern is corroded such that a corresponding portion of the light-emitting region is extinguished, as shown in FIG. 6D. Finally, the specific character pattern is fully corroded such that the whole light-emitting region is extinguished, as shown in FIG. 6E.

Although the corrosion process of the OLED element is described above in connection with FIGS. 6A to 6E, the present disclosure is not limited thereto. For the same OLED element, there may be various paths for corrosion. For example, the path for corrosion may be arranged to traverse the pattern from one side to another.

Figure 7:
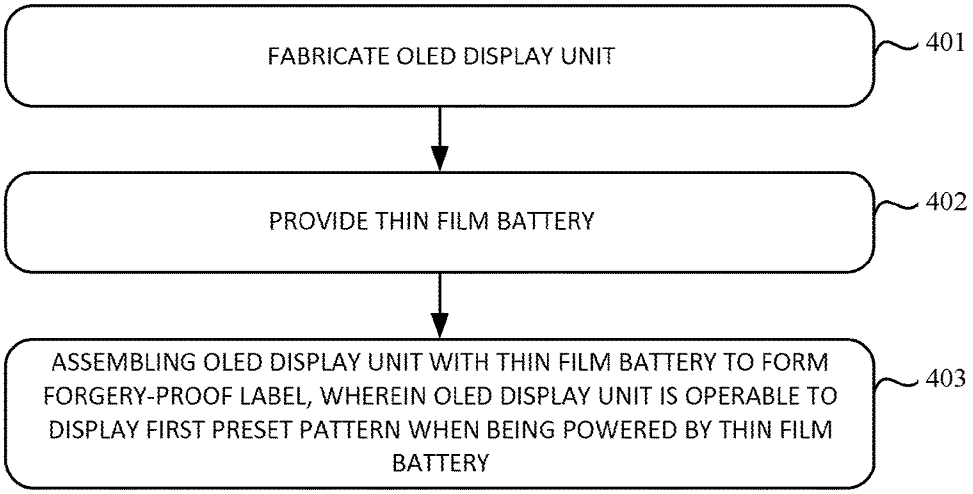
FIG. 7 is a flow chart of a method of fabricating a forgery-proof label according to an embodiment of the present disclosure.

FIG. 7 is a flow chart of a method of fabricating a forgery-proof label according to an embodiment of the present disclosure. As shown in FIG. 7, the method includes the following steps.

At step 401, an OLED display unit is fabricated. Specifically, the step of fabricating the OLED display unit may comprise:

providing a substrate;

forming an OLED element on the substrate, the OLED element having a light-emitting region of the first preset pattern;

forming an encapsulation layer on the OLED element, the encapsulation layer extending along an outline of at least part of the light-emitting region for defining a path along which water and oxygen corrode the OLED element; and forming an encapsulation thin film on the OLED element and the encapsulation layer for protecting the OLED element from corrosion by the water and oxygen.

Further, forming the OLED element on the substrate may comprise:

forming an anode layer on the substrate;

forming a pattern demarcation layer on the anode layer for defining the light-emitting region of the first preset pattern;

forming an organic functional layer in the light-emitting region; and forming a cathode layer on the organic functional layer and in the light-emitting region.

At step 402, a thin film battery is provided.

At step 403, the OLED display unit is assembled with the thin film battery to form the forgery-proof label. The OLED display unit is operable to display a first preset pattern when being powered by the thin film battery.

In some embodiments, the OLED display unit and the thin film battery 102 are arranged side by side.

In some embodiments, the OLED display unit and the thin film battery 102 are stacked on top of each other. In this case, a thin film insulation sheet may be provided between the OLED display unit and the thin film battery. The thin film insulation sheet is removable such that when it is removed the OLED display unit has access to power supplied by the thin film battery. In an embodiment, part of the thin film insulation sheet is exposed outside the OLED display unit. This facilitates the removal of the thin film insulation sheet.

It should be noted that the term "forgery-proof" is not used herein in a limiting sense. In other words, the "forgery-proof label" as disclosed herein may be used as a label that is used for identifying purposes in a generic sense.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and are not for purposes of limitation.

What is claimed is:

1. A forgery-proof label, comprising:
a thin film battery; and
an OLED display unit operable to display a first preset pattern when being powered by the thin film battery, wherein the OLED display unit comprises:
a substrate;
an OLED element arranged on the substrate and having a light-emitting region of the first preset pattern;
an encapsulation layer arranged on the OLED element and extending along an outline of at least part of the light-emitting region for defining a path along which water and oxygen corrode the OLED element; and
an encapsulation thin film arranged on the OLED element and the encapsulation layer for protecting the OLED element from corrosion by the water and oxygen.

2. The forgery-proof label of claim 1, wherein the encapsulation layer is arranged to incompletely encompass the light-emitting region when viewed from above such that the path has an entrance, and wherein the encapsulation thin film is arranged to have a removable portion corresponding to the entrance.

3. The forgery-proof label of claim 2, wherein the substrate is made of glass, metal, quartz or organic material.

4. The forgery-proof label of claim 2, wherein the encapsulation layer is made of inorganic material or a combination of inorganic material and organic material.

5. The forgery-proof label of claim 1, wherein the OLED element comprises:
an anode layer;
a pattern demarcation layer arranged on the anode layer for defining the light-emitting region of the first preset pattern;
an organic functional layer arranged in the light-emitting region; and
a cathode layer arranged on the organic functional layer and in the light-emitting region;
wherein the organic functional layer is operable to provide light emission upon application of power supplied by the thin film battery to the anode layer and the cathode layer.

6. The forgery-proof label of claim 5, wherein the substrate is made of glass, metal, quartz or organic material.

7. The forgery-proof label of claim 5, wherein the encapsulation layer is made of inorganic material or a combination of inorganic material and organic material.

8. The forgery-proof label of claim 1, wherein the substrate is made of glass, metal, quartz or organic material.

9. The forgery-proof label of claim 1, wherein the encapsulation layer is made of inorganic material or a combination of inorganic material and organic material.

10. The forgery-proof label of claim 9, wherein the inorganic material comprises at least one of SiNx, SiOx or SiCN.

11. The forgery-proof label of claim 1, further comprising a thin film insulation sheet arranged between the OLED display unit and the thin film battery for providing electrical insulation therebetween, wherein the thin film insulation sheet is removable such that when it is removed the OLED display unit has access to power supplied by the thin film battery.

12. The forgery-proof label of claim 11, wherein part of the thin film insulation sheet is exposed outside the OLED display unit.

13. The forgery-proof label of claim 1, wherein the first preset pattern comprises a character or a figure.

14. The forgery-proof label of claim 1, wherein the OLED display unit is a flexible display unit.

15. A method of fabricating a forgery-proof label, comprising steps of:
fabricating an OLED display unit, comprising:
providing a substrate;
forming an OLED element on the substrate, the OLED element having a light-emitting region of a first preset pattern;
forming an encapsulation layer on the OLED element, the encapsulation layer extending along an outline of at least part of the light-emitting region for defining a path along which water and oxygen corrode the OLED element; and
forming an encapsulation thin film on the OLED element and the encapsulation layer for protecting the OLED element from corrosion by the water and oxygen;
providing a thin film battery; and
assembling the OLED display unit with the thin film battery to form the forgery-proof label;
wherein the OLED display unit is operable to display the first preset pattern when being powered by the thin film battery.

16. The method of claim 15, wherein forming the OLED element on the substrate comprises:
forming an anode layer on the substrate;
forming a pattern demarcation layer on the anode layer for defining the light-emitting region of the first preset pattern;
forming an organic functional layer in the light-emitting region; and
forming a cathode layer on the organic functional layer and in the light-emitting region.

17. The method of claim 15, wherein the step of assembling the OLED display unit with the thin film battery further comprises:
providing a thin film insulation sheet between the OLED display unit and the thin film battery, the thin film insulation sheet being removable such that when it is removed the OLED display unit has access to power supplied by the thin film battery.

* * * * *